(12) United States Patent
Miyabayashi

(10) Patent No.: US 7,992,173 B2
(45) Date of Patent: Aug. 2, 2011

(54) RECEPTION DEVICE

(75) Inventor: Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 749 days.

(21) Appl. No.: 10/513,439

(22) PCT Filed: May 13, 2003

(86) PCT No.: PCT/JP03/05937

§ 371 (c)(1),
(2), (4) Date: May 4, 2005

(87) PCT Pub. No.: WO03/096683

PCT Pub. Date: Nov. 20, 2003

(65) Prior Publication Data

US 2005/0193418 A1    Sep. 1, 2005

(30) Foreign Application Priority Data

May 13, 2002 (JP) ................................ 2002-136609

(51) Int. Cl.
```
G06F 3/00      (2006.01)
G06F 13/00     (2006.01)
H04N 5/445     (2011.01)
H04N 7/20      (2006.01)
H04N 7/173     (2011.01)
H04N 5/50      (2006.01)
```

(52) U.S. Cl. ................ 725/54; 725/39; 725/46; 725/52; 725/56; 725/68; 725/90; 725/131; 725/151; 348/732; 348/564; 348/715

(58) Field of Classification Search .................... 725/38, 725/39, 46, 52, 54, 56, 68, 90, 131, 148, 725/151; 348/732, 564, 715
See application file for complete search history.

(56) References Cited

U.S. PATENT DOCUMENTS

| | | | | |
|---|---|---|---|---|
| 5,719,637 A | * | 2/1998 | Ohkura et al. | 725/56 |
| 5,822,123 A | * | 10/1998 | Davis et al. | 725/43 |
| 5,850,218 A | * | 12/1998 | LaJoie et al. | 725/45 |
| 5,867,207 A | * | 2/1999 | Chaney et al. | 725/54 |
| 6,104,908 A | * | 8/2000 | Schaffner et al. | 725/78 |

(Continued)

FOREIGN PATENT DOCUMENTS

JP    7-177504    7/1995

(Continued)

Primary Examiner — Brian T Pendleton
Assistant Examiner — Pinkal R Chokshi
(74) Attorney, Agent, or Firm — Oblon, Spivak, McClelland, Maier & Neustadt, L.L.P.

(57) ABSTRACT

A receiver that provides continuous scrolling when a program guide is displayed and scrolled in a channel direction, even if displayed content extends across transponders. Front-end circuits, and a memory circuit that accumulates received data are provided. An OSD circuit that forms an image signal in accordance with the data accumulated in the memory circuit and a system control circuit are provided. The control circuit performs control such that, in a period in which an image is displayed using the data received by the front-end circuit and accumulated in the memory circuit, the front-end circuit receives another transponder and accumulates data to be required next in the memory circuit, and in a period in which an image is displayed using the data received by the front-end circuit and accumulated in the memory circuit, the front-end circuit receives another transponder and accumulates data to be required next in the memory circuit.

8 Claims, 7 Drawing Sheets

U.S. PATENT DOCUMENTS

| | | | | |
|---|---|---|---|---|
| 6,115,080 A * | 9/2000 | Reitmeier | | 348/731 |
| 6,118,498 A * | 9/2000 | Reitmeier | | 348/725 |
| 6,334,217 B1 * | 12/2001 | Kim | | 725/38 |
| 6,477,705 B1 * | 11/2002 | Yuen et al. | | 725/41 |
| 6,481,010 B2 * | 11/2002 | Nishikawa et al. | | 725/44 |
| 6,493,876 B1 * | 12/2002 | DeFreese et al. | | 725/100 |
| 6,519,011 B1 * | 2/2003 | Shendar | | 348/731 |
| 6,522,342 B1 * | 2/2003 | Gagnon et al. | | 715/716 |
| 6,584,153 B1 * | 6/2003 | Gordon et al. | | 375/240.13 |
| 6,600,503 B2 * | 7/2003 | Stautner et al. | | 715/854 |
| 6,680,756 B1 * | 1/2004 | Morisada | | 348/732 |
| 6,714,264 B1 * | 3/2004 | Kempisty | | 348/732 |
| 6,732,371 B1 * | 5/2004 | Lee et al. | | 725/41 |
| 6,804,824 B1 * | 10/2004 | Potrebic et al. | | 725/38 |
| 6,976,266 B1 * | 12/2005 | Chaney et al. | | 725/39 |
| 7,146,626 B1 * | 12/2006 | Arsenault et al. | | 725/46 |
| 7,272,657 B2 * | 9/2007 | Allen et al. | | 709/231 |
| 7,456,826 B2 * | 11/2008 | Jurisch et al. | | 345/179 |
| 2001/0022631 A1 * | 9/2001 | Scheffler et al. | | 348/731 |
| 2002/0070958 A1 * | 6/2002 | Yeo et al. | | 345/723 |
| 2003/0030755 A1 * | 2/2003 | Ahn | | 348/732 |
| 2003/0161395 A1 * | 8/2003 | Byers | | 375/240.01 |
| 2003/0199246 A1 * | 10/2003 | Friedman et al. | | 455/3.01 |

FOREIGN PATENT DOCUMENTS

| | | |
|---|---|---|
| JP | 8-140002 | 5/1996 |
| JP | 10-257446 | 9/1998 |
| JP | 10-294930 | 11/1998 |
| JP | 11-215445 | 8/1999 |
| JP | 11-266413 | 9/1999 |
| JP | 2000-324004 | 11/2000 |
| JP | 2001-309258 | 11/2001 |
| JP | 2003-51754 | 2/2003 |

* cited by examiner

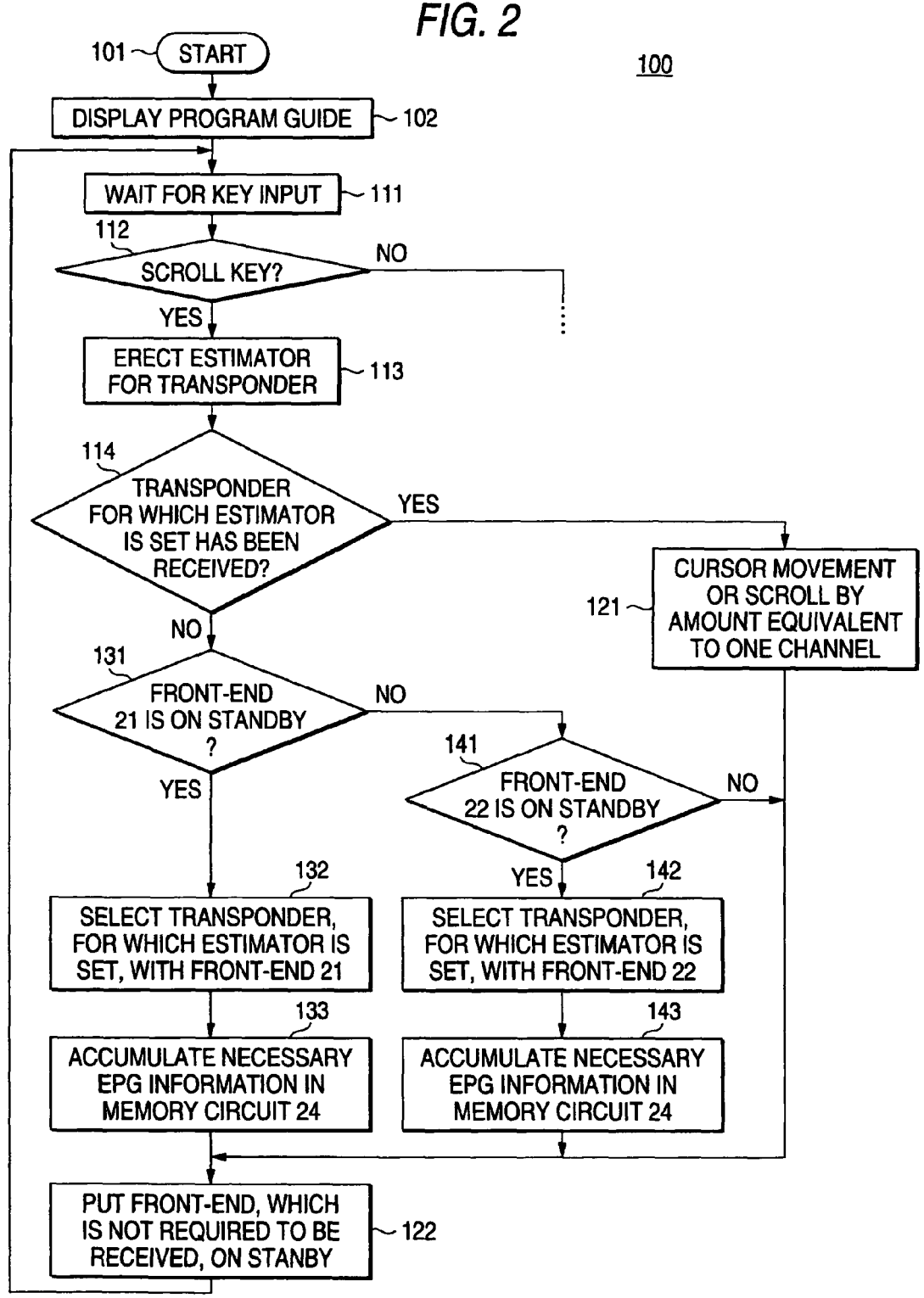

FIG. 3A

| | | 10:00 | 11:00 | 12:00 | |
|---|---|---|---|---|---|
| △ | 123 | Shopping | Formula 1 Grand Prix | | ⎫ |
| | 124 | News | | | |
| | 125 | A Trip Along the Chuo Line | | Mt. Fuji | TRANS-PONDER n |
| | 126 | Major League Baseball Line | | | |
| | 127 | Heidi | To See My Mother 7000 Miles Away | Aesop' Fables | |
| | 128 | Net Surfing | Seven Wonders of the World | | ⎭ |
| ▽ | 129 | Tale of Genji | Narrow Road to the Deep North | Pillow Book | } n + 1 |

FIG. 3B

| | | 10:00 | 11:00 | 12:00 | |
|---|---|---|---|---|---|
| △ | 124 | News | | | ⎫ |
| | 125 | A Trip Along the Chuo Line | | Mt. Fuji | |
| | 126 | Major League Baseball Line | | | TRANS-PONDER n |
| | 127 | Heidi | To See My Mother 7000 Miles Away | Aesop' Fables | |
| | 128 | Net Surfing | Seven Wonders of the World | | ⎭ |
| | 129 | Tale of Genji | Narrow Road to the Deep North | Pillow Book | ⎱ n + 1 |
| ▽ | 130 | Classical Music Concert | | | ⎰ |

FIG. 3C

| | | 10:00 | 11:00 | 12:00 | |
|---|---|---|---|---|---|
| △ | 125 | A Trip Along the Chuo Line | | Mt. Fuji | ⎫ |
| | 126 | Major League Baseball Line | | | |
| | 127 | Heidi | To See My Mother 7000 Miles Away | Aesop' Fables | TRANS-PONDER n |
| | 128 | Net Surfing | Seven Wonders of the World | | ⎭ |
| | 129 | Tale of Genji | Narrow Road to the Deep North | Pillow Book | ⎫ |
| | 130 | Classical Music Concert | | | n + 1 |
| ▽ | 131 | Theater Live Performance | | | ⎭ |

FIG. 7A

| | 10:00 | 11:00 | 12:00 | |
|---|---|---|---|---|
| 123 | Shopping | Formula 1 Grand Prix | | |
| 124 | News | | | TRANSPONDER n |
| 125 | A Trip Along the Chuo Line | | Mt. Fuji | |
| 126 | Major League Baseball Line | | | |
| 127 | Heidi | To See My Mother 7000 Miles Away | Aesop' Fables | |
| 128 | Net Surfing | Seven Wonders of the World | | TRANSPONDER (n + 1) |
| 129 | Tale of Genji | ///////////// | ///////////// | |
| | ◁ | | ▷ | |

FIG. 7B

| | 10:00 | 11:00 | 12:00 | |
|---|---|---|---|---|
| 129 | Tale of Genji | Narrow Road to the Deep North | Pillow Book | |
| 130 | XXXX | YYYY | ZZZZ | TRANSPONDER (n + 1) |
| 131 | ⋮ | ⋮ | | |
| | ◁ | | ▷ | |

RECEPTION DEVICE

TECHNICAL FIELD

The present invention relates to a receiver for digital television broadcasting such as digital satellite broadcasting and digital ground wave broadcasting.

BACKGROUND ART

In the digital television broadcasting, as shown FIG. 6, a frequency band for the digital television broadcasting is divided into plural bands called transponders, and in each of the transponders, various kinds of digital information such as plural television programs, moving images, voices, and various data are broadcast in a multiplexed form.

In the digital television broadcasting, since plural channels (television programs) are broadcast in one transponder, so-called picture-in-picture for displaying, in a screen of a certain channel, a reduced screen of another channel in the same transponder can also be performed. Alternatively, if a digital recorder such as a HDD (Hard Disk Drive) is prepared in a receiver, while watching a television program of a certain channel, a viewer (user) can also record a television program of another channel in the same transponder.

In addition, in the case in which a program is broadcast in a standard system by one transponder, six channels (services) can be broadcast at the maximum, and in the case in which a program is broadcast in a high definition system, two channels can be broadcast at the maximum. Consequently, in the case in which a television program is broadcast in a transponder, data of an EPG (Electronic Program Guide) is broadcast simultaneously. Further, the receiver of the digital television broadcasting is adapted such that a program guide can be displayed using the broadcast data of the EPG and a desired program can be selected from the program guide.

Therefore, according to the digital television broadcasting and the receiver therefor, the viewer (user) can enjoy a larger number of channels compared with analog television broadcasting.

Incidentally, when the program guide is displayed using the data of the EPG, for example, as shown in FIG. 7A, a program guide in which a horizontal axis represents hours and a vertical axis represents channels is displayed. Then, when the viewer instructs scroll in an hour direction, this program guide is scrolled in a lateral direction, and the viewer can learn about programs in hours not shown in the figure. When the viewer instructs scroll in a channel direction, this program guide is scrolled in a longitudinal direction, and the viewer can learn about programs in channels not shown in the figure.

However, as shown in FIG. 6, in the case in which television programs are broadcast in a certain transponder n, although an EPG broadcast in the transponder n has detailed information on the programs broadcast in the transponder n, the EPG only has simple information on programs broadcast in other transponders.

Therefore, when a program guide is displayed when a receiver is receiving the certain transponder n, for example, as shown in FIG. 7A, although program names and broadcasting hours are displayed in detail for each channel for the transponder n, only a program name of a program being currently broadcast is displayed for an adjacent transponder (n+1), and nothing is displayed for programs to be broadcast following the program.

Then, when the transponder being received is switched from the transponder n to the transponder (n+1), as shown in FIG. 7B, program names and broadcasting hours are displayed in detail for each channel for the transponder (n+1). Note that, in this case, for a transponder (n+2) adjacent to the transponder (n+1), only a program name of a program being currently broadcast is displayed, and nothing is displayed for programs to be broadcast following the program.

Then, time a little less than one second is required from the time when the receiver instructs a front-end circuit to switch a transponder to be received until the time when the transponder is actually switched and, thereafter, data of an EPG is obtained stably.

Therefore, in the case in which a program guide is displayed to scroll, when the scroll moves across transponders, the scroll temporarily stops. Thus, the scroll becomes awkward to give stress and feeling of low operability to the viewer.

In addition, for example, as shown in FIGS. 8A and 8B, if the receiver displays reduced screens of three consecutive channels in a state of moving images by using the function of picture-in-picture and switches channels to be the reduced screens in order in accordance with an instruction of the viewer (such display will be hereinafter referred to as "channel scroll display"), the viewer can select a channel while actually watching program contents. However, even in the case of this channel scroll display, when channels to be displayed extend across transponders, since switching of the channels stops temporarily, the scrolling also gives feeling of low operability and stress to the viewer.

In view of the points as described above, it is an object of the invention to, when a program guide is displayed to scroll in a channel direction or the channel scroll display is performed, prevent the scrolling from stopping even if displayed contents extend across transponders.

DISCLOSURE OF THE INVENTION

The invention discloses a receiver including:

first and second front-end circuits that receive transponders of digital television broadcasting;

a memory circuit that accumulates data included in the transponders received by the first and the second front-end circuit;

a circuit that forms an image signal that is displayed as a predetermined image in accordance with the data accumulated in the memory circuit; and a control circuit that controls the transponders received by the first and the second front-end circuit, characterized in that the control circuit performs control such that, in a period in which a predetermined image is displayed using the data of the transponder received by the first front-end circuit and accumulated in the memory circuit, the second front-end circuit receives another transponder and accumulates data to be required next for display of the image in the memory circuit, and in a period in which a predetermined image is displayed using the data of the transponder received by the second front-end circuit and accumulated in the memory circuit, the first front-end circuit receives another transponder and accumulates data to be required next for display of the image in the memory circuit.

Therefore, data to be required for display are accumulated in the memory circuit, and scroll display is executed smoothly according to the data.

BRIEF DESCRIPTION OF THE DRAWINGS

FIG. 2 is a flowchart showing a mode of the invention.
FIG. 3 is a diagram for explaining the invention.
FIGS. 7A and 7B are diagrams for explaining the invention.

BEST MODE FOR CARRYING OUT THE INVENTION

Figure 1:
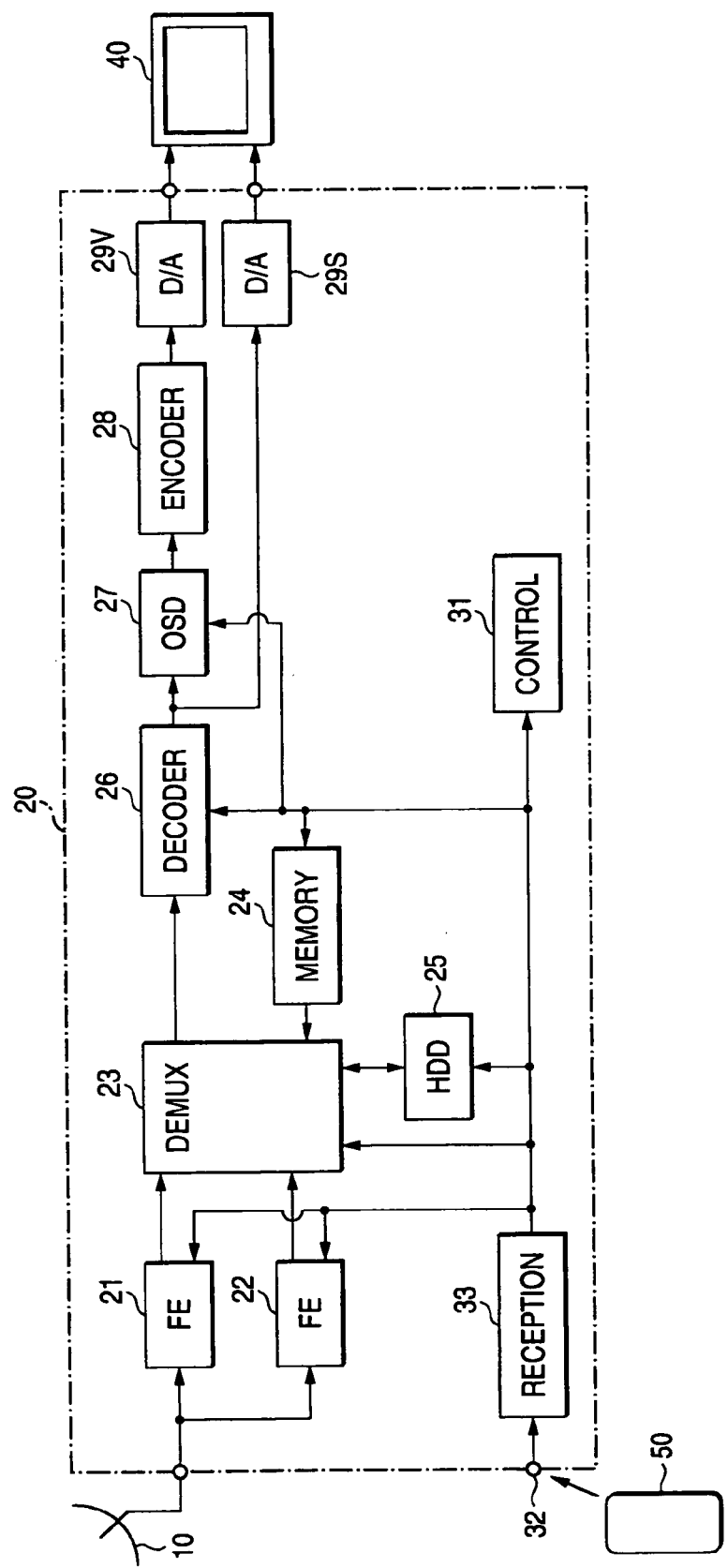
FIG. 1 is a system diagram showing a mode of the invention.

FIG. 1 shows a mode in the case in which a receiver according to the invention is constituted in a form of a set-top box. In short, digital television broadcasting is received and down-converted into an intermediate-frequency signal by an antenna 10, and this intermediate-frequency signal is supplied to first and second front-end circuits (tuner circuits) 21, 22 of a receiver 20. In these front-end circuits 21, 22, the intermediate-frequency signal supplied to the front-end circuits 21, 22 is multiplied by a local oscillation signal, and the intermediate-frequency signal is converted into a base band signal. Moreover, in the front-end circuits 21, 22, the base band signal is synchronously pull in and subjected to processing such as decoding and error correction, and a transport stream is outputted from the front-end circuits 21, 22.

Then, this transport stream is supplied to a demux circuit 23 with a fixed length of 188 bytes as a basic unit and classified into image data, voice data, data for data broadcasting, and various information data incidental to those data in accordance with a packet ID (Identification). The classified data are temporarily stored in a storage circuit for temporary storage, for example, a memory circuit 24. Note that, for example, a HDD 25 is connected to the demux circuit 23 as a device for accumulation of programs and is controlled in accordance with an operation of a viewer as described later. In addition, when new data is received, the data accumulated in the memory circuit 24 are updated.

Then, the image data and the voice data among the data stored in the memory circuit 24 are supplied to a MPEG (Motion Picture Image Coding Experts Group) decoder circuit 26 through the demux circuit 23, subjected to decode processing to be original digital image data and digital voice data, and the digital image data is supplied to an OSD (On Screen Demand) circuit 27. In this case, it is assumed that the MPEG decoder circuit 26 can simultaneously decode image data of moving images equivalent to three channels at the maximum for a reduced screen. In addition, the OSD circuit 27 is controlled by a system control circuit 31 to be described later and is used for forming digital image data for displaying various characters and graphics, for example, digital image data to be displayed as a program guide and composing this image data with the digital image data from the MPEG decoder circuit 26.

Then, the digital image data from the OSD circuit 27 is supplied to, for example, an NTSC encoder circuit 28 and encoded into a digital video signal of an NTSC system. This digital video signal and the digital voice data are supplied to D/A (Digital to Analog) converter circuits 29V, 29S and D/A converted into an analog video signal and an analog voice signal. These signals are supplied to, for example, a television receiver 40 and outputted as an image and a voice.

In addition, the data for data broadcasting and the incidental information data among the data stored in the memory circuit 24 are analyzed by the system control circuit 31 and used as a text for data broadcasting or used as information for packet separation in the demux circuit 23.

Further, the system control circuit 31 is constituted by a microcomputer or the like, and a real time OS is mounted on the microcomputer. The OSD circuit 27 is controlled by this system control circuit 31, and the formation and composition of the image data for display are performed as described above. Note that the image data to be displayed as a program guide in the television receiver 40 is formed based on the received data of the EPG in this OSD circuit 27.

In addition, when the viewer operates a remote control transmitter 50, a remote control signal, for example, an infrared ray outputted from the transmitter 50 is received by a photo-sensor 32, and an output signal of the photo-sensor 32 is processed by a reception circuit 33 and, then, supplied to the system control circuit 31. Then, the microcomputer constituting the system control circuit 31 is interrupted, and processing corresponding to an operation of the transmitter 50 is executed.

Then, the front-end circuits 21, 22, the demux circuit 23, and the HDD 25 are controlled by the system control circuit 31, and switching of transponders to be received from the front-end circuits 21, 22 and selection of image data and voice data to be supplied from the memory circuit 24 to the MPEG decoder circuit 26 are performed by this control.

In addition, writing and reading with respect to the HDD 25 are also controlled by the system control circuit 31. Image data and voice data of a predetermined channel in transponders being received by the front-end circuits 21, 22 are written in the HDD 25 or image data and voice data written in the HDD 25 are read out and supplied to the MPEG decoder circuit 26.

Therefore, the viewer can receive arbitrary programs of arbitrary transponders with the front-end circuits 21, 22, respectively, and can view the programs with the television receiver 40. In addition, in that case, the viewer can also perform picture-in-picture for arbitrary programs. Moreover, the viewer can also record a program being viewed or a program in another channel in the HDD 25 and view the recorded program.

Further, in particular, in the invention, for example, a routine 100 shown in FIG. 2 is prepared in the microcomputer constituting the system control circuit 31 as a part of software executed by the microcomputer. Although a part of the routine 100 related to the invention is excerpted and shown in FIG. 2, this routine 100 is a routine for controlling display of a program guide (and channel scroll display).

In short, this routine 100 alternately switches transponders received by the front-end circuits 21, 22, whereby, for example, as shown in FIG. 3, in the case in which a displayed program guide is scrolled in a channel direction (direction of a vertical axis), even when the program guide extends across the transponders, display is scrolled smoothly without stopping temporarily.

Here, it is assumed that the viewer is watching a program of a channel broadcast in the transponder n. In addition, at this point, it is assumed that the front-end circuit 21 is receiving the transponder n and the front-end circuit 22 is receiving the next transponder (n+1). Note that, since the transponders n and (n+1) are being received, at this point, data of an EPG for channels broadcast in the transponders n and (n+1) are accumulated in the memory circuit 24.

Then, in such a state, when the viewer instructs display of a program guide with the remote control transmitter 50, in the system control circuit 31, processing of the routine 100 starts from step 101. In the next step 102, image data of a program guide of the transponders n and (n+1) currently being received is formed by the OSD circuit 27 using the data of the EPG stored in the memory circuit 24, and this image data is supplied to the NTSC encoder circuit 28.

Therefore, for example, as shown in FIG. 3A, a program guide of a $123^{rd}$ channel to $129^{th}$ channel included in the transponder n being currently received is displayed on the television receiver 40, and a program guide of the $129^{th}$ channel included in the next transponder (n+1) is integrally displayed continuously. In addition, although not shown in the figure, a cursor is displayed in a row of a channel, which has been received, in this program guide.

Subsequently, the processing proceeds to step 111. In this step 111, the processing waits for input from an operation key of the remote control transmitter 50. When the operation key is pressed, the processing proceeds to step 112. In this step 112, it is judged whether the key inputted in step 111 is a scroll key in the channel direction. When the key is the scroll key in the channel direction, the processing proceeds from step 112 to step 113, and an estimator for a transponder is set.

This estimator is prepared for each transponder. When the scroll key pressed by step 111 is a key of a direction in which a channel number increases (at the time of a key operation for moving the cursor displayed on the program guide in a downward direction in FIG. 3A), an estimator for the transponder (n+1) is set to "1", and estimators of other transponders are reset to "0". Conversely, when the scroll key pressed by step 111 is a key of a direction in which a channel number decreases (at the time when a key operation for moving the cursor displayed on the program guide to an upward direction in FIG. 3A), an estimator for a transponder (n−1) is set to "1", and estimators for other transponders are reset to "0".

In other words, when the scroll key pressed by step 111 is a key of a direction in which a channel number increases, an estimator for the next transponder (in this case, the transponder (n+1)) of a transponder that has been used for display of a program to that point (in this case, the transponder n) is set to "1", and estimators for other transponders are reset to "0". Conversely, when the scroll key pressed by step 111 is a key of a direction in which a channel number decreases, an estimator for a transponder (in this case, the transponder (n−1)) before the transponder, which has been used for a program to that point, is set to "1", and estimators for other transponders are reset to "0".

Subsequently, the processing proceeds to step 114. In this step 114, it is judged whether data of an EPG of a transponder corresponding to the estimator set by step 113 has been received and is accumulated in the memory circuit 24. In this case, since the corresponding transponder is the transponder (n+1), and data of an EPG of the transponder is accumulated in the memory circuit 24, the processing proceeds from step 114 to step 121. In this step 121, the cursor displayed on the program guide is moved in the channel direction by an amount equivalent to one channel. Alternatively, when the cursor is displayed in a lowermost row or an uppermost row of the program guide, the program guide is scrolled by an amount equivalent to one channel in a direction in which a channel number increases or decreases. FIG. 3B shows a case in which the program guide is scrolled by an amount equivalent to one channel in the direction in which a channel number increases.

Then, following step 121, the processing proceeds to step 122. In this step 122, a front-end circuit, which is not required to receive a transponder, of the front-end circuits 21, 22 is put on standby (a state in which an output of the front-end circuit is not used effectively). Thereafter, the processing returns to step 111.

Therefore, when the viewer presses the scroll key in the channel direction of the remote control transmitter 50, concerning channels of transponders for which data necessary for display of a program guide is accumulated in the memory circuit 24, the cursor moves in response to an operation of the scroll key in the channel direction, and the program guide is scrolled in the direction in which a channel number increases or decreases.

On the other hand, if the data of an EPG of a transponder corresponding to the estimator set by step 113 is not accumulated in the memory circuit 24 in step 114, the processing proceeds from step 114 to step 131. In this step 131, it is judged whether the front-end circuit 21 is on standby. When the front-end circuit 21 is on standby, the processing proceeds from step 131 to step 132. In this step 132, a transponder, for which an estimator is set by step 113, is selected by the front-end circuit 21.

Subsequently, in step 133, data of an EPG is fetched from the transponder selected by the front-end circuit 21 and accumulated in the memory circuit 24. Thereafter, the processing returns to step 111 through step 122.

In addition, when the front-end circuit 21 is not on standby in step 131, that is, when various necessary data are being received, the processing proceeds from step 131 to step 141. In this step 141, it is judged whether the front-end circuit 22 is on standby. Then, when the front-end circuit 22 is on standby, the processing proceeds from step 141 to step 142. In this step 142, a transponder, for which an estimator is set by step 113, is selected by the front-end circuit 22.

Subsequently, in step 143, data of an EPG is fetched from the transponder selected by the front-end circuit 22 and is accumulated in the memory circuit 24. Thereafter, the processing returns to step 111 through step 122. Note that, when the front-end circuit 22 is not on standby in step 141, that is, when various necessary data are being received, the processing returns to step 111 from step 141 through step 122.

Therefore, according to steps 131 to 133 and 141 to 143, in the case in which scroll in the channel direction is performed, if there is a front-end circuit, which is not used for reception of transponders, in the front-end circuits 21, 22, a transponder to be required next for display of a program guide is selected by the front end-circuit, and data of an EPG of the transponder is accumulated in the memory circuit 24. Then, if data of an EPG necessary for display is accumulated in the memory circuit 24, a program guide corresponding to the data of the EPG is displayed by step 121.

In other words, operations in which, <1> in a period in which a program guide is displayed using data of a transponder received by the front-end circuit 21, the front-end circuit 22 receives an adjacent transponder and accumulates data of a subsequent part of the program guide to be required next in the memory circuit 24; and <2> in a period in which a program guide is displayed using data of a transponder received by the front-end circuit 22, the front-end circuit 21 receives an adjacent transponder and accumulates data of a subsequent part of the program guide to be required next in the memory circuit 24, are alternately repeated, and the program guide is displayed to scroll.

Note that, when a determination key is operated in step 111, the processing ends the routine 100 from step 111 through step 112, and a channel in which the cursor is placed in the program guide is selected. Alternatively, when there is no key input for, for example, three seconds, after the processing shifts to step 111, the processing ends the routine 100 from step 111 through step 112, and a display screen is returned to an original channel.

Therefore, when the program guide is displayed to scroll and extends across two transponders, since data necessary for the display has already been accumulated in the memory circuit 24, the program guide is scrolled smoothly, and the scroll never becomes awkward. Therefore, the scroll never gives stress and feeling of low operability to the viewer.

Moreover, when the viewer instructs scroll in the channel direction with the transmitter 50, a gap between the instruction for scroll and speed of actual scroll on the screen of the television receiver 40 is reduced. Thus, a user interface that is more easily understood intuitively can be provided.

In addition, a receiver that can perform recording of a program of another channel and picture-in-picture is originally provided with two font-end circuits 21, 22. Thus, scroll display in a channel direction of a program guide can be performed smoothly simply by changing software.

Figure 4A:
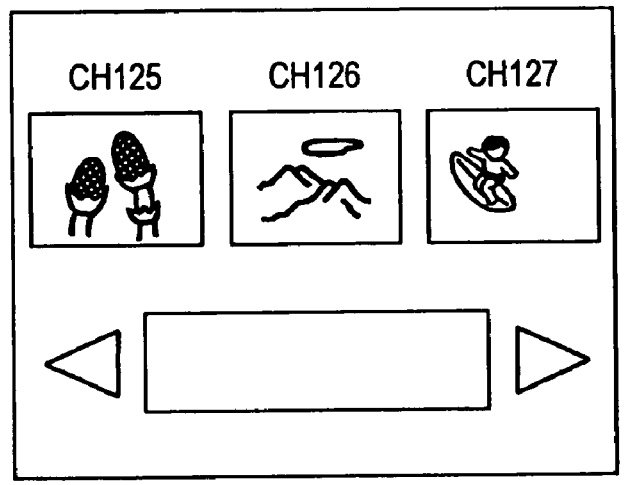
FIG. 4 is a diagram for explaining the invention.
Figure 4B:
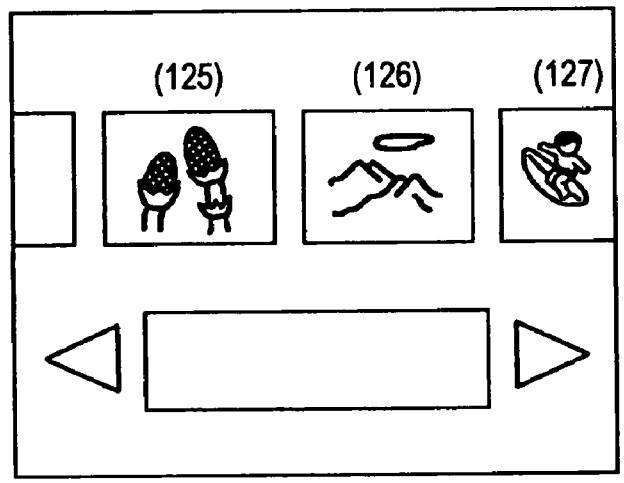
Figure 4C:
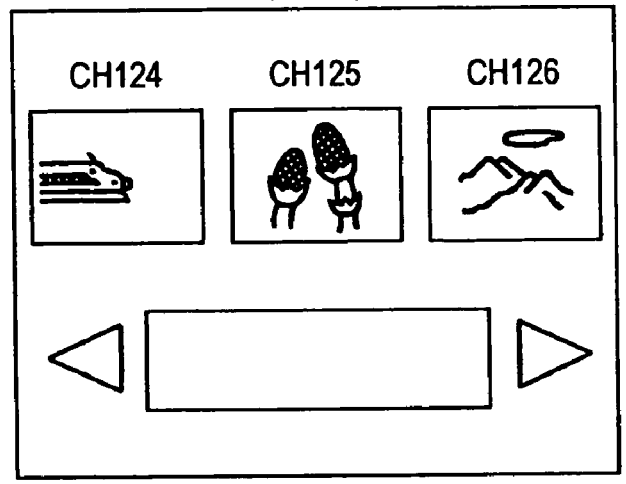
Figure 8A:
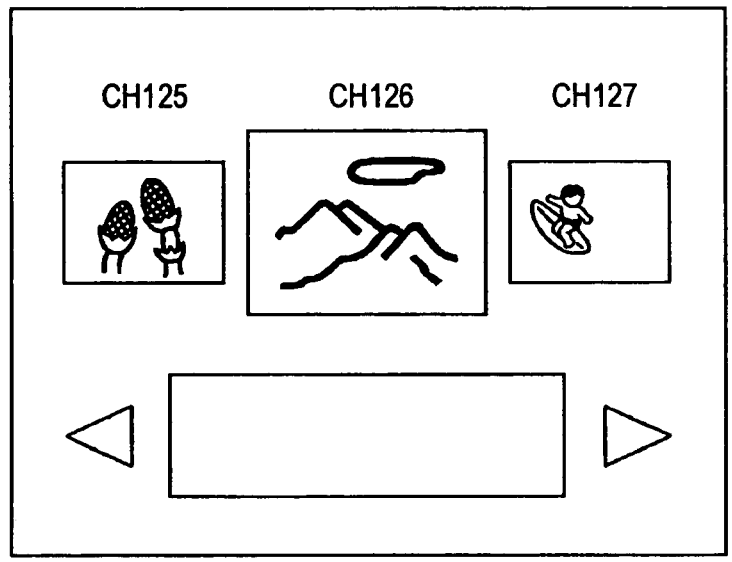
FIGS. 8A and 8B are diagrams for explaining the invention.
Figure 8B:
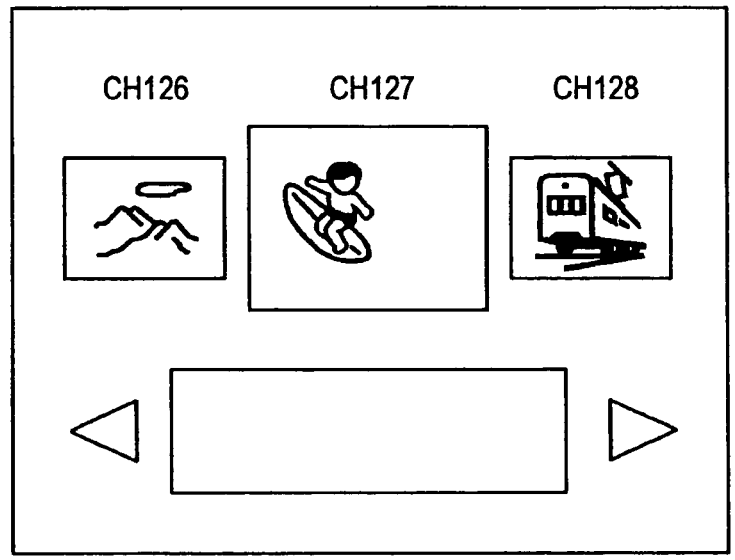

Note that, as described above, in the case in which the channel scroll display is performed, for example, as shown in FIGS. 8A and 8B, if reduced screens of moving images of three channels with consecutive channel numbers are simultaneously displayed by step 121, and necessary image data is accumulated in the memory circuit 24 by steps 133, 143, even when reduced screens displayed by the channel scroll display extend across two transponders, the channel scroll display never stops temporarily. Moreover, at that point, the reduced screens can be changed to a moving image. In addition, for example, as shown in FIG. 4A, it is also possible to perform the channel scroll display by continuously moving reduced screens of each channel.

Figure 5:
FIG. 5 is a diagram for explaining the invention.
Figure 6:
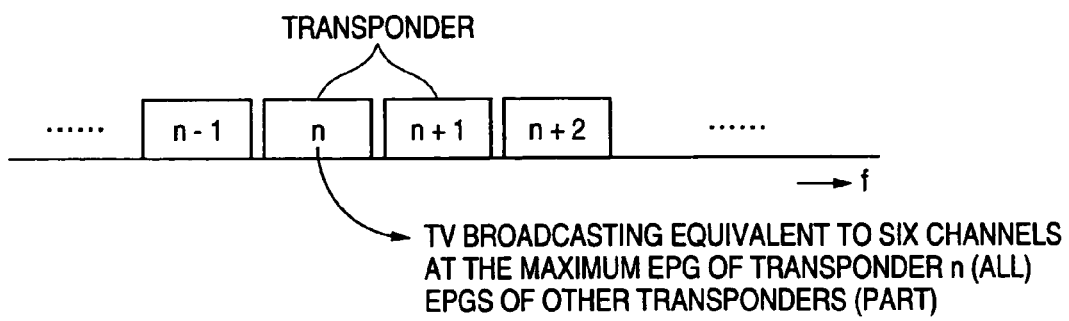
FIG. 6 is a diagram for explaining the invention.

Moreover, for example, as shown in FIG. 5, when the viewer classifies programs into genres according to interests of the viewer, displays the genres with priorities, and selects a genre, the viewer can display programs included in the genre as a list. In that case, the viewer only has to rearrange the channels by genre and also rearrange the channels by transponder, prepare estimators obtained by weighting genre information with priorities at this point, and receive a transponder to be received next in a free front-end circuit in advance. In this way, waiting time at the time when the viewer switches a channel to the next channel can be reduced.

In addition, in the case of broadcasting of a carousel system such as data broadcasting, it takes time from the time when reception is started until the time when all data for display are collected. In such a case, if the one front-end circuit 21 is used for usual tuning, a transponder in which target data broadcasting is present is always received by the other front-end circuit 22, and data are accumulated in the memory circuit 24, the viewer can instantly switch a state in which the viewer watches a program being received by the front-end circuit 21 to reception of designated data broadcasting.

According to the invention, since data is accumulated expecting a channel switching request of a viewer, when tuning is performed across transponders, information can be updated earlier.

Moreover, when the viewer instructs scroll in the channel direction, a gap between the instruction for scroll and speed of actual scroll on a display screen is reduced. Thus, a user interface that is more easily understood intuitively can be provided.

In addition, a receiver, which can perform recording of a program of another channel and picture-in-picture, can perform scroll display in the channel direction and the channel scroll display smoothly simply by changing software.

The invention claimed is:

1. A receiver in a digital television broadcasting system with a broadcasting frequency band divided into a plurality of sub-frequencies called transponders, each transponder including a multiple number of channels, said receiver comprising:
    a first front-end circuit configured to receive a first transponder including a first multiple number of channels when the first front-end circuit is switched out of a standby mode;
    a second front-end circuit configured to receive a second transponder including a second multiple number of channels concurrently with the first front-end circuit receiving the first transponder including the first multiple number of channels when the second front-end circuit is switched out of the standby mode;
    a memory circuit configured to accumulate data included in the transponders received by the first front-end circuit and the second front-end circuit;
    an image forming circuit configured to form an image signal that is displayed as a predetermined image in accordance with the data accumulated in the memory circuit; and
    a control circuit configured to set an estimator for each transponder and to control the transponders received by the first front-end circuit and the second front-end circuit, the estimators being set for adjacent transponders based on a prediction regarding which adjacent transponders will be required,
    wherein
    the control circuit sets an estimator for a current transponder as active, sets an estimator for a transponder adjacent to a current transponder as active based on the prediction, and resets an estimator for each remaining transponder as inactive in response to a requested channel number changing,
    wherein the control circuit sets an estimator selecting a transponder after a current transponder which is used for presentation of images and resets estimators for other transponders in a case that a scroll key pressed is a key of direction in which a channel number increases, and the control circuit sets an estimator selecting a transponder before a current transponder which is used for presentation of images and resets estimators of other transponders in a case that a scroll key pressed is a key of direction in which a channel number decreases, and
    in a period in which a predetermined image is displayed using the data of the first transponder received by the first front-end circuit and accumulated in the memory circuit, the control circuit switches the second front-end circuit out of the standby mode to receive another transponder and to accumulate data to be required next for display of the image in the memory circuit, determines whether the data received by the second front-end circuit to be required next for display is accumulated, and switches the second front-end circuit into the standby mode based on the determination that the data received by the second front-end circuit to be required next is accumulated, and
    in a period in which a predetermined image is displayed using the data of the second transponder received by the second front-end circuit and accumulated in the memory circuit, the control circuit switches the first front-end circuit out of the standby mode to receive another transponder and to accumulate data to be required next for display of the image in the memory circuit, determines whether the data received by the first front-end circuit to be required next for display is accumulated, and switches the first front-end circuit into the standby mode based on the determination that the data received by the first front-end circuit to be required next is accumulated.

2. The receiver according to claim 1, wherein the memory circuit is further configured to accumulate data of an EPG, and the image forming circuit comprises an OSD circuit, and is further configured to form an image that is a program guide based on the data of the EPG.

3. The receiver according to claim 1, wherein the memory circuit is further configured to accumulate data of a moving image, the image forming circuit comprises an MPEG decoder circuit, and the image forming circuit is further configured to concurrently form a plurality of images, each image of the plurality of images being an image of a reduced moving image based on the data of the moving image.

4. The receiver according to claim 1, wherein the transponder corresponding to data to be required next is provided, and when an estimator of this transponder is set, data corresponding to the estimator is accumulated in the memory circuit.

5. The receiver according to claim 4, wherein priorities are set for the estimator by a viewer.

6. A receiving method of a digital television broadcasting system with a broadcasting frequency band divided into a plurality of sub-frequencies called transponders, each transponder including a multiple a number of channels, said method comprising:

receiving transponders of digital television broadcasting each including a multiple number of channels with a first front-end circuit when the first front-end circuit is switched out of a standby mode;

receiving transponders of digital television broadcasting each including a multiple number of channels with a second front-end circuit when the second front-end circuit is switched out of the standby mode;

accumulating data included in transponders received by the first front-end circuit and the second front-end circuit in a memory circuit;

forming an image signal that is displayed as a predetermined image in accordance with the data accumulated in the memory circuit;

setting an estimator for a current transponder as active, setting an estimator for a transponder adjacent to a current transponder as active, and setting an estimator for each remaining transponder as inactive in response to a requested channel number changing, the estimator being set for the adjacent transponder based on a prediction regarding which adjacent transponder will be required;

setting an estimator for a transponder after a current transponder which is used for presentation of images and resetting estimators for other transponders based on the prediction such that in a case that a scroll key pressed is a key of direction in which a channel number increases;

setting an estimator for a transponder before a current transponder which is used for presentation of images and resetting estimators for other transponders based on the prediction such that in a case that a scroll key pressed is a key of direction in which a channel number decreases; and performing control, wherein in a period in which a predetermined image is displayed using the data of the first transponder received by the first front-end circuit and accumulated in the memory circuit, the second front-end circuit is switched out of the standby mode and receives another transponder and accumulates data to be required next for display of the image in the memory circuit, a control circuit determines whether the data received by the second front-end circuit to be required next for display is accumulated, and the second front-end circuit is switched into the standby mode based on the determination that the data received by the second front-end circuit to be required next is accumulated, and in a period in which a predetermined image is displayed using the data of the second transponder received by the second front-end circuit and accumulated in the memory circuit, the first front-end circuit is switched out of the standby mode and receives another transponder and accumulates data to be required next for display of the image in the memory circuit, the control circuit determines whether the data received by the first front-end circuit to be required next for display is accumulated, and the first front-end circuit is switched into the standby mode based on the determination that the data received by the first front-end circuit to be required next is accumulated.

7. The receiver according to claim 3, wherein the image forming circuit is further configured to display the plurality of images horizontally adjacent to each other.

8. The receiver according to claim 7, wherein the image forming circuit is further configured to display a middle image of the plurality of images larger than the other images of the plurality of images.

* * * * *